Jan. 19, 1926.
J. G. BRYANT
GRINDING MILL
Filed July 21, 1922
1,570,456
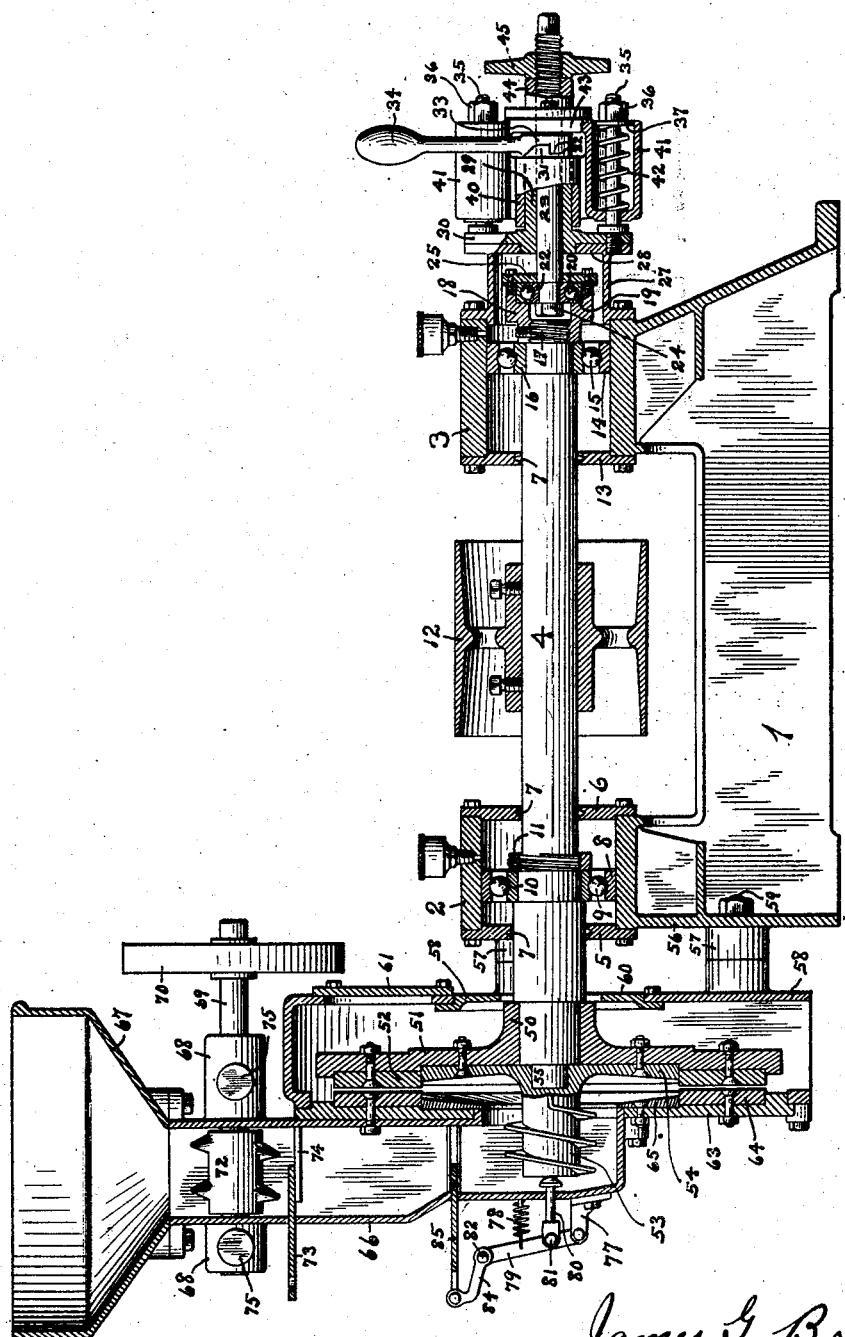
Inventor
James G. Bryant
By Edward N. Pagelsen
Attorney Patented Jan. 19, 1926.

1,570,456

UNITED STATES PATENT OFFICE.

JAMES G. BRYANT, OF PORT HURON, MICHIGAN.

GRINDING MILL.

Application filed July 21, 1922. Serial No. 576,415.

*To all whom it may concern:*

Be it known that I, JAMES G. BRYANT, a citizen of the United States, and residing at Port Huron, in the county of St. Clair and State of Michigan, have invented a new and Improved Grinding Mill, of which the following is a specification.

This invention relates to feed grinders and especially to means for adjusting the operative or grinding faces of two axially alined disks rotatable relative to each other, and its object is to provide resilient means for moving the grinding disks or plates toward each other and positive means for separating these disks and positively adjustable means to determine the clearance between these grinding faces when in operative position.

A further object of this invention is to provide means for automatically closing the feed gate when the grinding disks or plates are separated.

Another object of this invention is to provide a feed worm and distributing plate integral with each other so that the two can be secured in position with the same fastening devices.

Another object of this invention is to provide an annular bearing for the main shaft especially adapted to resist radial pressures and a second bearing especially adapted to resist the end thrust of the shaft.

Another object of this invention is to provide an end thrust bearing for the main shaft which may serve as a retainer for the annular bearing.

Another object of this invention is to provide a main frame which shall carry all the bearings and in which all the bearings shall always be in perfect alinement.

The accompanying drawing is a central longitudinal vertical section of a grinding mill embodying the present invention and shows a main frame 1 having cylindrical heads 2 and 3 which are accurately bored in alinement with each other. While being so bored, the ends of these heads are faced so that all the parts connected to the main shaft 4 must always function with exactness. Two heads 5 and 6 attach to the faces of the head 2 and are provided with grooves 7 to receive packing rings to prevent the entrance of dust. Within this head is an outer bearing ring 8, balls 9, and an inner bearing ring 10 held in position by the nut 11. A driving pulley 12 is shown attached to the shaft between the heads 2 and 3 but any other desired means may be employed to drive the shaft.

The rear head 3 has an end plate 13, and within it is an annular bearing for the shaft consisting of the outer bearing ring 14, balls 15 and inner ring 16. The end 17 of the shaft is threaded to receive a hub or housing 18 which receives the outer bearing ring 19 of a thrust bearing, balls 20 and an inner ring 22 attached to the adjacent end of the control stem 23 by means of a nut 24. This hub or housing 18 holds the annular bearing in position on the shaft. A plate 25 is attached to the hub or housing 18 and holds the thrust bearing in position. The outer bearing rings 8 and 14 are slidable in the heads 2, 3 when the shaft 4 is moved longitudinally by the control stem 23.

Attached to the head 3 is a cylindrical housing 27 having an outer annular head 28 to which is attached the sleeve 29 having an end flange 30. The outer end of this sleeve is formed with cam teeth 31 which cooperate with the corresponding cam teeth 32 of the cam plate 33 to which the control handle 34 is attached. The bolts 35 connect to the head 28 of the housing 27 and the end flange 30 of the sleeve 29, and these bolts 35 have nuts 36 and washers 37 on their outer ends. A yoke is mounted on the sleeve 29 and consists of a cylindrical central portion 40 and two cups 41 on opposite sides thereof through which the bolts 35 extend, springs 42 on these bolts in these cups serving to press this yoke toward the head 3. A disk 43 connects the outer ends of these cups and to it a nut 44 is attached. The outer end of the stem 23 is threaded to fit in this nut 44 and a jamb nut 45 may be screwed down to prevent rotation of this stem.

The action of the springs 42 is to push the yoke and the nut 44 toward the left in the drawing and with them the stem 23 and shaft 4. This pressure is taken up by the thrust bearing comprising the rings 19 and 22 and the balls 20.

Mounted on the opposite or forward end of the shaft is a hub 50 of the disk 51 to which the grinding plate 52 is attached. The feed worm 53 is integral with the distributing plate 54 which is also attached to the disk 51. The end 55 of the main shaft accurately centers the feed worm and distributer plate so that all parts are necessarily in alinement. The end plate 56 of the main frame 1 is formed with bosses 57 which may be faced off when the heads 2 and 3 are bored and a housing 58 is attached to these bosses by the bolts 59. A removable central ring 60 permits ready assembly and the hand-hole plate 61 permits removal of the nuts which hold in position the parts attached to the disk 51.

An end 63 is attached to the housing 58 and supports the grinding plate 64, the distributer plate 65, and the chute 66. A hopper 67 of any desired construction may be mounted on the top of the chute. Bearings 68 may be attached to the chute for the shaft 69 which carries a pulley 70 by means of which the feed going down to the grinding disks may be kept from arching above the valve plate 73 which is slidable on flanges 74. The circle 75 represent grease cups.

The two grinding plates 52 and 64 are held toward each other by springs 42 and the distance between them is determined by the threaded stem 23 and the nut 44. The stem is held from turning by the jamb nut 45. The outer position of the nut 44 is determined by the depth of the teeth 31 and 32. In order therefore to change the grinding distance between the plates 52 and 64, the jamb nut 45 is released and the stem 23 is turned either one way or the other.

The gate 73 normally controls the feed of grain to the screw 53 which carries it into the space between the distributer plates 54 and 65 from which space it passes out radially between the grinder plates 52 and 64. If straw is mixed with the grain, it is liable to accumulate in the space between the distributer plates. The shaft 4 may then be moved to the right by means of the cam plate 33 to permit the straw to pass out freely between the plates 52 and 54.

In order to stop the flow of grain while these grinder plates are separated, a small bracket 77 may be mounted on the chute 66 and a spring 78 is provided to pull inward the lever 79, mounted on this bracket. A stem 80 pivoted to this lever at 81 contacts with the end of the feed screw 53 and controls the position of the pin 82 at the outer end of the lever to which is attached the link 84 which actuates the gate valve 85. When, therefore, the handle 34 is swung to pull out the shaft 4 to separate the grinder plates, the pin 80 follows this shaft and causes the gate valve 85 to move inward to cut off the flow of grain from the hopper 67.

Attention is called to the fact that ball bearings operate with minimum friction and are therefore most efficient when the points of contact of the balls are in alinement with the lines of stress or pressure. For this reason, bearings to receive radial thrust should be constructed differently from those which receive end thrust. The bearings which resist radial thrust should have their points of contact along lines which are as nearly parallel to the shaft as possible. In the present case the thrust on the balls 20 is in both directions and the thrust bearing is therefore so constructed that the points of contact are in lines which are between lines parallel to the shaft and at right angles thereto.

The details of construction and the proportions of the parts may all be changed by those skilled in the art without departing from the spirit of my invention as set forth in the following claims.

I claim:—

1. In combination, a main shaft and a stub shaft in alinement therewith, a thrust bearing mounted on and supported by one end of the main shaft and adapted to receive one end of the stub shaft, an additional bearing in which the main shaft is rotatable and slidable, and an additional bearing in which the stub shaft is mounted.

2. In combination, a main shaft and a stub shaft in alinement therewith, a thrust bearing embodying a pair of bearing rings, one of said rings being connected to the stub shaft, a housing connected to the other bearing ring and to the main shaft, and additional bearings in which said shafts are slidable.

3. In a grinding mill, the combination with alined annular grinding plates, one of them stationary, a shaft on which the other plate is mounted, bearings for rotatably and slidably supporting the shaft, resilient means for pressing the plates toward each other, means mounted on the shaft to feed grain to the grinding plates and means operable by the slidable shaft to control the feed of grain to the grinding plates.

4. In combination, a main shaft and a stub shaft in alinement therewith, a thrust bearing embodying a pair of bearing rings, one of said rings being connected to the stub shaft, a housing connected to the other bearing ring and to the main shaft, additional bearings in which said shafts are slidable, and means for moving said shafts longitudinally in their bearings.

5. In a grinding mill, the combination with annular grinding plates, a shaft on which one of said plates is mounted, means to rotate the shaft, bearings for rotatably and slidably supporting the shaft, a housing attached to one end of the shaft, a stem extending into said housing, a thrust bearing between the adjacent ends of the shaft and stem, a sleeve for slidably supporting the stem and having cam teeth in its outer end, a yoke slidable on the sleeve, and having a perforated disk at its outer end through which the stem extends, a cam plate between said disk and the end of the sleeve and cooperating with said cam teeth to move the yoke outward, and means engaging said yoke and said stem to cause the stem and shaft to move outward with the yoke.

6. In a grinding mill, the combination with annular grinding plates, a shaft on which one of said plates is mounted, means to rotate the shaft, bearings for rotatably and slidably supporting the shaft, a housing attached to one end of the shaft, a stem extending into said housing, a thrust bearing between the adjacent ends of the shaft and stem, a sleeve for slidably supporting the stem and having cam teeth in its outer end, a yoke slidable on the sleeve, and having a perforated disk at its outer end through which the stem extends, a cam plate between said disk and the end of the sleeve and cooperating with said cam teeth to move the yoke outward, and springs to press the yoke, stem and shaft inward.

7. In a grinding mill, the combination with annular grinding plates, a shaft on which one of said plates is mounted, means to rotate the shaft, bearings for rotatably and slidably supporting the shaft, a housing attached to one end of the shaft, a stem extending into said housing, a thrust bearing between the adjacent ends of the shaft and stem, a sleeve for slidably supporting the stem and having cam teeth in its outer end, a yoke slidable on the sleeve and having a perforated disk at its outer end through which the stem extends, a cam plate between said disk and the end of the sleeve and cooperating with said cam teeth to move the yoke outward, said means embodying a threaded portion of said stem and a nut attached to said yoke in which said stem is adjustably mounted.

8. In a grinding mill, the combination of a frame, a shaft rotatably and slidably mounted in said frame, means to move said shaft longitudinally in either direction, a housing mounted on one end of the frame and into which the shaft extends, cooperating annular grinding plates attached to the housing and shaft respectively, distributer plates attached to the housing and shaft within the grinding plates, a feed screw formed integral with the distributer plate attached to the shaft and extending in alinement with the shaft through the distributer plate on the housing, a control gate slidably mounted in said chute, a lever pivoted on the chute and connected to said gate, and means connected to the lever and engaging the end of said feed screw to cause the gate to obstruct the chute when the grinding disks are separated by the longitudinal movement of the shaft.

9. In a grinding mill, a pair of alined annular grinding plates, one of said plates being rotatable and adjustable toward and from the other, a chute to convey grain to the center of said plates, and a gate operatively connected to the rotatable plate adapted to obstruct the chute to prevent the passage of grain when said plates are separated.

10. In combination, a rotatable and slidable main shaft, a stub shaft in alinement therewith, a thrust bearing between said shafts embodying a bearing ring attached to the stub shaft, a second bearing ring and a housing to attach the second bearing ring to the main shaft, a frame embodying a cylindrical portion, and a ball bearing mounted on the shaft and slidable in said cylindrical portion of the frame and secured in position on the shaft by the housing.

11. In combination, a frame embodying heads integral therewith and having alined cylindrical chambers, said frame having projections whose faces are in a plane at right angles to the axis of said chambers, a housing secured to said faces, a shaft and bearings therefor mounted in said chambers, and grinding plates attached to said shaft and to the housing.

12. In a grinding mill, the combination with alined annular grinding plates, a shaft on which one of the plates is mounted, bearings for rotatably and slidably supporting the shaft, resilient means for pressing the plates toward each other, and means operable by the slidable shaft to control the feed of grain to the grinding plates.

13. In a grinding mill, the combination of a frame, a shaft rotatably and slidably mounted in said frame, means to move said shaft longitudinally in either direction, a housing mounted on one end of the frame and into which the shaft extends, co-operating annular grinding plates attached to the housing and shaft respectively, a distributer plate attached to the shaft within the grinding plates, a feed screw formed integral with the distributer plate attached to one of the grinding plates and extending in alinement with the shaft through the other grinding plate, a control gate, a lever pivoted on the chute and connected to said gate, and means connected to the lever and engaging the end of said feed screw to cause the gate to stop the feed when the grinding disks are separated by the longitudinal movement of the shaft.

14. In a grinding mill, the combination of alined grinding plates, a shaft to support one of the plates, bearings for said shaft provided with bearing balls having contact points in radial lines, a thrust bearing for the shaft provided with bearing balls having contact points in lines inclined to the shaft, means connecting to the thrust bearing to positively move the shaft endwise to separate the grinding plates, and means to regulate said endwise movement of the shaft.

15. In a grinding mill, the combination of alined grinding plates, a shaft to support one of the plates, bearings for said shaft provided with bearing balls having contact points in radial lines, a thrust bearing for the shaft provided with bearing balls having contact points in lines inclined to the shaft, means connecting to the thrust bearing to positively move the shaft endwise to separate the grinding plates, and means to regulate said endwise movement of the shaft, said thrust bearing serving to position one of the radial bearings on said shaft.

JAS. G. BRYANT